United States Patent

Glück et al.

[11] Patent Number: 5,986,006
[45] Date of Patent: Nov. 16, 1999

[54] USE OF POLYMETHACRYLIC ACIDS AS BRANCHING AGENTS

[75] Inventors: Alexander Glück, Freinsheim; Walter Götz, Ludwigshafen; Gregor Ley, Wattenheim, all of Germany

[73] Assignee: BASF Aktiengesellschaft, Ludwigshafen, Germany

[21] Appl. No.: 09/000,388

[22] PCT Filed: Oct. 22, 1996

[86] PCT No.: PCT/EP96/04582

§ 371 Date: Jan. 29, 1998

§ 102(e) Date: Jan. 29, 1998

[87] PCT Pub. No.: WO97/16490

PCT Pub. Date: May 9, 1997

[30] Foreign Application Priority Data

Oct. 31, 1995 [DE] Germany ............... 195 40 555

[51] Int. Cl.⁶ ............... C08L 75/00; C08L 77/00; C08L 77/02; C08L 77/12
[52] U.S. Cl. ............... 525/178; 525/182; 525/183; 525/184; 525/185
[58] Field of Search ............... 525/178, 182, 525/183, 184, 185

[56] References Cited

U.S. PATENT DOCUMENTS

| | | |
|---|---|---|
| 4,554,320 | 11/1985 | Reimann et al. . |
| 4,818,793 | 4/1989 | Matthies et al. . |
| 4,900,788 | 2/1990 | Subramanian . |
| 5,003,009 | 3/1991 | Matthies et al. . |

FOREIGN PATENT DOCUMENTS

| | | |
|---|---|---|
| 1335219 | 4/1995 | Canada . |
| 96 264 | 12/1983 | European Pat. Off. . |
| 176 978 | 4/1986 | European Pat. Off. . |
| 452 305 | 10/1991 | European Pat. Off. . |
| 452 306 | 10/1991 | European Pat. Off. . |
| 495 363 | 7/1992 | European Pat. Off. . |
| 495 368 | 7/1992 | European Pat. Off. . |
| 651 018 | 5/1995 | European Pat. Off. . |
| 90/07555 | 7/1990 | WIPO . |
| 90/07556 | 7/1990 | WIPO . |

*Primary Examiner*—Nathan M. Nutter
*Attorney, Agent, or Firm*—Keil & Weinkauf

[57] ABSTRACT

Homo- or copolymers A composed of $A_1$) 40–100% by weight of monomers of the general formula I

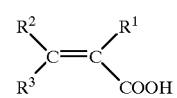

$A_2$) 0–60% by weight of monomers of the general formula II

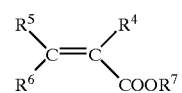

and $A_3$) 0–10% by weight of further monomers capable of free radical polymerization, the percentages by weight of the monomers $A_1$) to $A_3$) summing to 100% and $R^1$ and $R^4$ being identical or different radicals and each being hydrogen or $C_1$–$C_4$-alkyl, $R^2$, $R^3$, $R^5$, $R^6$ being identical or different radicals and each being hydrogen or $C_1$–$C_4$-alkyl, with the proviso that at least two radicals from the group consisting of $R^1$, $R^2$ and $R^3$ and from the group consisting of $R^4$, $R^5$ and $R^6$ are hydrogen, and $R^7$ is alkyl, cycloalkyl, aryl or aralkyl, are used as branching agents for amino-containing thermoplastic polymers.

11 Claims, No Drawings

USE OF POLYMETHACRYLIC ACIDS AS BRANCHING AGENTS

This application claims benefit under 37CFR 371 of application PCT/EP96/04582, filed Oct. 22, 1996.

BRIEF SUMMARY OF THE INVENTION

The present invention relates to a method of using a homo- or copolymers A composed of $A_1$) 40–100% by weight of monomers of the general formula I

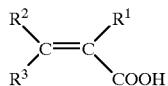

$A_2$) 0–60% by weight of monomers of the general formula II

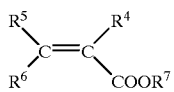

and $A_3$) 0–10% by weight of further monomers capable of free radical polymerization, the percentages by weight of the monomers $A_1$) to $A_3$) summing to 100% and $R^1$ and $R^4$ being identical or different radicals and each being hydrogen or $C_1$–$C_4$-alkyl, $R^2$, $R^3$, $R^5$, $R^6$ being identical or different radicals and each being hydrogen or $C_1$–$C_4$-alkyl, with the proviso that at least two radicals from the group consisting of $R_1$, $R^2$ and $R^3$ and from the group consisting of $R^4$, $R^5$ and $R^6$ are hydrogen, and $R^7$ is alkyl, cycloalkyl, aryl or aralkyl, as branching agents for amino-containing thermoplastic polymers.

The present invention furthermore relates to thermoplastic polyamide molding materials which contain the novel branching agents, processes for the preparation of the molding materials, their use for the production of moldings of all types and the moldings obtainable thereby.

BACKGROUND OF THE INVENTION

Polyacrylic acids and polymethacrylic acids have long been known and are commercially available as, inter alia, Sokalan® (BASF AG). These polymers are usually used as additives for reduced-phosphorus and phosphate-free detergents and cleaning agents or as dispersants for solids (for example for preventing coatings in water treatment).

Suitable polymer compositions which can be used for the production of hollow articles by extrusion blow molding require, inter alia, high molecular weights in the case of polyamides.

In blow molding, a tube of polymer melt is generally extruded and is suspended between the two half-shells of the opened mold. The mold is then closed and the polymer tube is pressed against the mold by means of internal gas pressure, cooled and removed from the mold.

In this processing, it is essential that the polymer tube does not tear during extrusion in the periods when it is freely suspended between the molds, so that the molding process can be completed. It is also desirable that the tube does not sag, since this results in smaller wall thicknesses in the upper half and larger wall thicknesses in the lower half. Hollow articles having different wall thicknesses are unsuitable for use since the strength is as a rule limited by the point having the smallest wall thickness.

Particularly problematic is the danger of breaking of the melt or sagging in the case of glass fiber-reinforced polymer melts, since these have a high density (and hence a high tensile force on the upper part of the polymer tube) and at the same time the maximum extensibility of the polymer melt required to break is smaller in the case of these reinforced materials.

Both factors are governed by the melt rigidity, which depends primarily on the melt viscosity. What would be ideal is a high melt viscosity with little shearing—ie. after extrusion—but a low melt viscosity under a steep shear gradient—ie. in the processing extruder.

DESCRIPTION OF THE RELATED ART

This high melt viscosity can be achieved, inter alia, by compounding, for example, polyamides, in particular with the desired additives, in an extruder and then subjecting them to a solid-phase thermal aftertreatment (heating process) until the desired molecular weight has been reached. This process is disclosed, for example, in EP-A 589 349. The disadvantage of this process is the long reaction time, ie. the process is very time-consuming and therefore expensive.

Another process for achieving high melt viscosities comprises compounding with a highly reactive branching agent, as disclosed in EP-A 495 363, EP-A 495 368, EP-A 452 305 and EP-A 452 306. However, the styrene/maleic anhydride copolymers used exhibit poor dispersing in the polymer, so that very greatly fluctuating viscosities are present from granular particle to granular particle and lead to poor processability and defective blow molded articles.

A further problem is that polyamide fibers are produced in considerable amounts from polyamides whose molecular weight is below that which is usual for industrial molding materials. Polyamides having viscosity numbers of 115–140 ml/g are used, whereas viscosity numbers of >135 ml/g are required for industrial molding materials. Since the production of polyamide fibers sets very high purity requirements for the polyamides used, it is necessary to find possible uses for such polyamides which, owing to impurities, do not meet these requirements. This also applies to intermediate runs which occur in considerable amounts during the changeover of products on continuous production lines. It is also necessary to find possible uses for spun polyamide fibers which, owing to poor quality, cannot be used for textile structures. Particular examples of these are partly filled bobbins, as obtained on interruptions to the spinning process due to blockage of the spinneret and in the case of product changes.

While relatively highly viscous waste of the stated type can be further processed to industrial molding materials without problems, this is not directly possible for the low-viscosity fiber wastes having viscosity numbers of 115–130 ml/g, since their molecular weight is too low, leading to poor mechanical properties.

DETAILED DESCRIPTION OF THE INVENTION

It is an object of the present invention to provide a suitable branching agent for increasing the melt viscosity of amino-containing polymers, which branching agent can be readily dispersed in the polymer and thus gives homogeneous polymer blends, in particular with polyamides.

The polymer blends should have a high melt viscosity so that trouble-free processing to blow molded articles is possible. In particular, processing to moldings having a large volume and uniform wall thickness should be possible.

In particular, processing should be possible with three-dimensional extrusion (ie. blow molding with little pinch-off), as described in DE-A 29 27 098, DE-A 31 15 306 and EP-A 256 442.

We have found that this object is achieved, according to the invention, by the use of the homo- or copolymere A) (branching agent) defined at the outset.

Preferred embodiments of the use are described in the subclaims.

Surprisingly, we have found that the branching agent A) as claimed in claim 1 increases the melt viscosity of amino-containing polymers, in particular of polyamides, in a suitable manner, so that the above disadvantages are avoided.

In particular, the novel polyamide molding materials have a high melt viscosity, which can be achieved in a short time by conventional compounding in an extruder. We have also found that the novel branching agents are suitable for increasing the viscosity of polyamides having low molecular weights, as are usual in the fiber sector, to such an extent that the novel molding materials prepared therefrom are suitable for injection molding to give industrial articles.

Preferred processes for the preparation and the use of the novel polyamide molding materials are described in the subclaims.

The homo- or copolymers A) which may be used according to the invention as crosslinking agents are composed of:

$A_1$) from 40 to 100, preferably from 80 to 100, % by weight of monomers of the general formula I

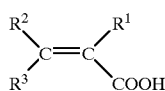

I $A_2$) from 0 to 60, preferably from 0 to 20, % by weight of monomers of the general formula II

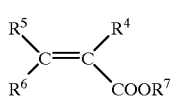

II and $A_3$) from 0 to 10, preferably from 0 to 5, % by weight of further monomers capable of free radical polymerization, the percentages by weight of the monomers $A_1$) to $A_3$) summing to 100% and $R^1$ and $R^4$ being identical or different radicals and each being hydrogen or $C_1$–$C_4$-alkyl, preferably hydrogen or methyl, in particular hydrogen, $R^2$,$R^3$,$R^5$ and $R^6$ being identical or different radicals and each being hydrogen or $C_1$–$C_4$-alkyl, preferably hydrogen, with the proviso that at least two radicals from the group consisting of $R^1$, $R^2$ and $R^3$ and from the group consisting of $R^4$, $R^5$ and $R^6$ are hydrogen, since otherwise the reactivity in the free radical polymerization is no longer sufficient, and $R^7$ being alkyl, cycloalkyl, aryl or aralkyl, preferably ethyl, hexyl, benzyl or toluyl, very particularly preferably methyl or butyl.

Mixtures of different radicals $R^7$ may also be used in the case of the monomers $A_2$).

The branching agents A) are prepared by conventional free radical solution or dispersion polymerization processes, by mixing the monomers with water and, if required, dispersants and an initiator (free radical former). For further details, reference is made at this point to B. Vollmert, Grundlagen der Makromolekularen Chemie, Karlsruhe 1979, Volume 1.

The further monomers $A_3$) capable of free radical polymerization are to be understood as meaning those which can be polymerized with the monomers $A_1$) and, if required, $A_2$) under the abovementioned conditions. Examples are styrene, butadiene, isoprene and vinyl acetate.

Preferred crosslinking agents which may be used according to the invention contain no monomers $A_3$).

The number average molecular weight ($M_n$) of the branching agents is in general from 4000 to 200,000, preferably from 25,000 to 100,000 g/mol, which can be determined, for example, by light scattering, GPC, vapor pressure osmosis or other conventional methods of determination, as described in B. Vollmert, Grundlagen der Makromolekularen Chemie, Karlsruhe 1979, Volume 3.

Preferred branching agents are polyacrylic acid, polymethacrylic acid and polymers of acrylic acid ($A_1$) with butyl acrylate ($A_2$) and methacrylic acid ($A_1$) with butyl acrylate ($A_2$).

According to the invention, amino-containing thermoplastic polymers are understood as meaning those polymers whose chains contain free $NH_2$ and/or NH groups which are capable of reacting with the acid group of the branching agent by amine formation or transamidation. Examples are polyurethanes, polyetheramides, polyesteramides, polyimides and polyamidoimides, polyamides, in particular polyamide 6, being preferred.

Such polymers and processes for their preparation are known to a person skilled in the art, and further details are therefore superfluous.

Novel thermoplastic molding materials containing

A) from 0.01 to 1, preferably from 0.01 to 0.5, in particular from 0.01 to 0.05, % by weight of homo- or copolymers as claimed in claim 1, B) from 20 to 99.99, preferably from 49.5 to 99.99, % by weight of a thermoplastic polyamide, and C) from 0 to 70, preferably from 0 to 50, % by weight of further additives and processing assistants, the sum of the percentages by weight of the components A) to C) being 100%, are particularly preferred.

The novel molding materials contain, as component A), homo- or copolymers A as claimed in claim 1—as described above.

The polyamides of the novel molding materials have in general a viscosity number (VN) of from 130 to 300 ml/g, according to ISO 307 and determined in a 0.5% strength by weight solution in 96% strength by weight solution of sulfuric acid at 25° C. Polyamides having a viscosity number of 170 to 250, in particular from 200 to 240, are preferably used (blow molding). For the processing of the fiber wastes, lower initial viscosities are present, viscosity numbers greater than 130, preferably greater than 140, ml/g being achieved after the reaction with the novel branching agents.

Semicrystalline or amorphous resins having a weight average molecular weight of at least 5,000, as described, for example, in U.S. Pat. Nos. 2,071,250, 2,071,251, 2,130,523, 2,130,948, 2,241,322, 2,312,966, 2,512,606 and 3,393,210, are preferred.

Examples of these are polyamides which are derived from lactams having 7 to 13 ring members, such as polycaprolactam, polycapryllactam and polylaurolactam, and polyamides which are obtained by reacting dicarboxylic acids with diamines.

Dicarboxylic acids which may be used are alkane dicarboxylic acids of 6 to 12, in particular 6 to 10, carbon atoms and aromatic dicarboxylic acids. Only adipic acid, azelaic acid, sebacic acid, dodecanedioic acid and terephthalic and/or isophthalic acid are mentioned as acids here.

Particularly suitable diamines are alkanediamines of 6 to 12, in particular 6 to 8, carbon atoms and m-xylylenediamine, di(4-aminophenyl)methane, di(4-aminocyclohexyl)methane, 2,2-di(4-aminophenyl)propane and 2,2-di(4-aminocyclohexyl)-propane.

Preferred polyamides are polyhexamethyleneadipamide, polyhexamethylenesebacamide and polycaprolactam.

Other examples of polyamides are those which are obtainable, for example, by condensation of 1,4-diaminobutane with adipic acid at elevated temperatures (polyamide 4,6). Preparation processes for polyamides having this structure are described, for example, in EP-A 38 094, EP-A 38 582 and EP-A 39 524.

Polyamides which are obtainable by copolymerization of two or more of the abovementioned monomers, or blends of a plurality of polyamides, are also suitable, any desired mixing ratio being possible. Examples of copolyamides are binary and ternary copolymers of terephthalic acid, isophthalic acid, hexamethylenediamine and ε-caprolactam (PA6T/6, PA6T/66).

Partly aromatic copolyamides whose triamine content is less than 0.5, preferably less than 0.3, % by weight, have also proven particularly advantageous.

Partly aromatic copolyamides prepared by most known processes (cf. U.S. Pat. No. 4,603,166) have triamine contents of more than 0.5% by weight, which leads to a deterioration in the product quality and to problems in the continuous preparation. Dihexamethylenetriamine, which is formed from the hexamethylenediamine used in the preparation, may be mentioned in particular as a triamine which causes these problems.

The preferred partly aromatic copolyamide having a low triamine content can be prepared by the processes described in EP-A 129 195 and 129 196.

The novel thermoplastic molding materials may contain, as component C), conventional additives and processing assistants, such as stabilizers, antioxidants, heat stabilizers and UV stabilizers, lubricants and mold release agents, colorants, such as dyes, pigments, fibers and particulate fillers and reinforcing agents, rubbers (impact modifiers), nucleating agents, plasticizers, etc., the amount of which is as a rule not more than 70, preferably not more than 50, % by weight.

Examples of antioxidants and heat stabilizers are halides of metals of group I of the Periodic Table, for example sodium halides, potassium halides and/or lithium halides, if necessary in combination with copper(I) halides, for example chlorides, bromides or iodides, stearically hindered phenols, hydroquinones, aromatic secondary amines, such as diphenylamines, various substituted members of these groups and mixtures thereof, in concentrations up to 1% by weight, based on the weight of the thermoplastic molding material.

Examples of UV stabilizers, which are used in general in amounts of up to 2% by weight, based on the molding material, are various substituted resorcinols, salicylates, benzotriazoles and benzophenones.

Furthermore, organic dyes, such as nigrosine, and pigments, such as titanium dioxide, cadmium sulfide, cadmium selenide, phthalocyanines, ultramarine blue and carbon black, may be added as colorants, and fibrous and particulate fillers and reinforcing agents may also be added. Examples of the latter are carbon fibers, glass fibers, amorphous silica, asbestos, calcium silicate (wollastonite), aluminum silicate, magnesium carbonate, kaolin, chalk, powdered quartz, mica and feldspar. The amount of such fillers and colorants is in general up to 50, preferably from 20 to 35, % by weight.

For example, talc, calcium fluoride, sodium phenylphosphinate, alumina, silica and nylon 22 may be used as nucleating agents.

Lubricants and mold release agents, which may be used, as a rule, in amounts of up to 1% by weight, are, for example, long-chain fatty acids, such as stearic acid or behenic acid, their salts (eg. calcium or zinc stearate) or esters (eg. stearyl stearate or pentaerythrityl tetrastearate) and amide derivatives (eg. ethylenedistearylamide). For better film processing, up to 0.1% by weight of mineral-based antiblocking agents may be added to the novel molding materials. Examples are amorphous or crystalline silica, calcium carbonate and aluminum silicate.

Examples of plasticizers are dioctyl phthalate, dibenzyl phthalate, butyl benzyl phthalate, hydrocarbon oils, N-(n-butyl)benzenesulfonamide and o- and p-tolylethylsulfonamide.

For further improvement of the flame retardance, all flameproofing agents known for polyamides may be added, in particular those based on phosphorus compounds or red phosphorus itself.

The homo- or copolymers A) which may be used according to the invention have sufficient reactivity with respect to amino-containing polymers, so that the increase in the melt viscosity (branching) may take place in a relatively short time. Furthermore, such branching agents can be readily dispersed in the polymer, so that the viscosity from granular particle to granular particle is very substantially the same.

The preparation of the novel thermoplastic molding materials is not critical per se, but some processes have proven particularly suitable.

Thus, granules can be prepared, for example, from the components B) and, if required, C), preferably in an extruder. The component A) in the form of a powder, melt or solution or dispersion can then be applied to these granules, after which compounding can be effected in the conventional manner.

In a further preferred process for the preparation of the novel thermoplastic molding materials, the component A) is mixed with the melt of the component B) and, if required, C). Here, extruders, in particular twin-screw extruders, have proven particularly useful. The mixture of the components can be melted together or the component A) can be added to the melt of the component B) and, if required, C). The processing temperatures are usually from about 10 to 50° C. above the melting point of the polyamide used (component B). Preferably, the products are then extruded and granulated.

In this preferred process, it is particularly advantageous that the polymers A) which may be used are water-soluble or water-dispersible. The addition can therefore be effected in the form of an aqueous solution or dispersion which has a solids content of 10–70, preferably 20–60, in particular 35–50, % by weight. In this way, sufficient dispersing and very high accuracy of the desired metering rate (constant metering rate) can be achieved even when very small amounts of the branching agent A) are added.

A devolatilization apparatus, which preferably generates a reduced pressure (less than 1 bar), is preferably present in the processing extruder, downstream of the feed point for component A).

The melt viscosity of the molding materials is increased to such an extent that it is possible to produce moldings which have large volumes and a uniform wall thickness over the entire shaped article. In particular, high molecular weight molding materials are used for the production of hollow articles by extrusion blow molding, since, during processing, the molding materials have a very high viscosity without shearing but a low viscosity with shearing.

The novel molding materials can be particularly readily used for the production of complex, three-dimensional hollow articles (for example highly curved pipes). Depending on the variant of the process, the parison is preformed before the mold is closed and only thereafter is blown by a relatively small factor. The preforming of the parison may be effected by manipulation with the aid of a robot or by placing the tube in a mold moved simultaneously below the extruder. This process leads to considerably less waste during pinch-off (3D blow molding or blow molding with little pinch-off).

The molding materials may also be used as components in coextrusion or sequential coextrusion.

Particular applications are blow molded articles, coextrudates, profile extrudates, tubular extrudates, 3D extrudates with little pinch-off, such as fuel tanks, fuel lines, air pipes subjected to high thermal stress (for example, connecting pipes between turbocharger, charge cooler and engine in turbo diesel engines), pipes and tanks carrying cooling water, hydraulic oil tanks and oil tanks. Advantages are the high barrier effect with respect to hydrocarbons, the high heat distortion resistance and the high heat-ageing resistance.

EXAMPLES

Component A

A/1: Polyacrylic acid having an average molecular weight ($M_n$) of 4000, 35% strength aqueous solution (Sokalan® CP10S from BASF AG)

A/2: Polyacrylic acid having an $M_n$ of 80,000, 50% strength aqueous solution (Sokalan® PA 80 S from BASF AG)

A/3: Polyacrylic acid having an $M_n$ of 110,000, 50% strength aqueous solution (Sokalan® PA 110 S from BASF AG)

A/4: Dispersion polymer comprising 40% by weight of acrylic acid ($A_1$) and 60% by weight of n-butyl acrylate ($A_2$), having an average particle size of 0.1 μm, in the form of a 40% strength aqueous dispersion (Acronal® DS 3467X from BASF AG)

A/1V Styrene/maleic anhydride copolymer containing 16% by weight of maleic anhydride (Dylarc® 332 from Arco Chem.)

A/2V Polyethylene containing 8% by weight of grafted acrylic acid (Polybond® 1009 from Uniroyal Chem.), MFI (190° C./2.16 kg) of 22 g/10 min.

Component B

B/1 Poly-ε-caprolactam (PA6) having a VN of 195 ml/g (determined according to ISO 307 as a 0.5% strength solution in 96% strength by weight sulfuric acid); Ultramid® B 35 from BASF AG)

B/2 PA6 having a VN of 250 ml/g; Ultramid® B4 from BASF AG

B/3 PA6 having a VN of 124 ml/g; Ultramid® BS 400 (standard fiber product)

B/4 pelletized fiber wastes comprising PA6, colored, having a VN of 119 ml/g

Component C

C/1 Carbon black having an average primary particle size of 0.4 μm

C/2 Cu I/K I complex (heat stabilizer)

C/3 chopped glass fibers having a fiber length of 6 mm, aminosilane size

Preparation of the molding materials

The components B were each processed with 0.5% by weight of C/1 and 200 ppm of Cu, component C/2 (Cu content based on the Cu I/K I complex), in a twin-screw extruder (ZSK 30 from Werner & Pfleiderer) at 290° C. and with a throughput of 8 kg/h to give a homogeneous melt. Thereafter, the respective components A) (for amounts, see table) were metered into this polymer melt, homogenized, discharged and granulated.

The VN of all products were determined for 12 granular particles in each case by single-particle VN measurements based on ISO 307 but with weighing of an individual granular particle per measurement, using a microviscometer (0.5% strength solution in 96% strength sulfuric acid). The minimum and maximum values were stated as a measure of the molecular weight fluctuations in the product. Furthermore, the MVR was determined at 250° C. and 10 kg applied weight.

Bottles having a volume of 800 ml were produced on an extrusion blow molding machine (from Voith) at 250° C. The weight of the blown bottles was determined and the processing visually assessed.

The results of the measurements and compositions of the molding materials are shown in Table 1.

In the examples for fiber polyamides (components B/3 and B/4), the VN was determined after compounding. Thereafter, test specimens were produced on an injection molding machine, and the tensile strength according to ISO 527 and impact strength according to ISO 179 were determined for the standard test specimens.

The results of the measurements and the compositions of the molding materials are shown in Table 2.

TABLE 1

| | Experiments with polyacrylic acid | | | | | | | |
|---|---|---|---|---|---|---|---|---|
| | Components [% by weight] | | | Weight of blow molded article | MVR | VN min | VN max | Assessment of |
| Example | B | A*) | C | [g] | [ml/10'] | [ml/g] | [ml/g] | blow molding |
| 1 | B/2 | 0.1 A/1 | | 95 | 6.5 | 305 | 318 | good |

TABLE 1-continued

| | | | | | | | | |
|---|---|---|---|---|---|---|---|---|
| 2 | B/2 | 0.1 A/2 | | 98 | 6.0 | 307 | 320 | good |
| 3 | B/2 | 0.1 A/3 | | 105 | 5.5 | 310 | 320 | good |
| 4 | B/2 | 0.25 A/2 | | 130 | 4.0 | 333 | 345 | good |
| 5 | B/1 | 0.25 A/2 | | 115 | 5.3 | 320 | 335 | good |
| 6 | B/2 | 0.2 A/2 | 20% C/3 | 265 | 4.5 | 310 | 330 | good |
| 7 | B/2 | 0.2 A/4 | | 94 | 6.4 | 300 | 312 | good |
| 8 | B/2 | 0.5 A/4 | | 119 | 4.6 | 325 | 333 | good |
| 9 | B/1 | 0.5 A/4 | | 108 | 5.0 | 320 | 333 | good |

*) in the case of component A, the respective dissolved or dispersed amount of solid was stated

| Example | Components [% by weight] B | A*) | C | Weight of blow molded article [g] | MVR [ml/10'] | VN min [ml/g] | VN max [ml/g] | Assessment of blow molding |
|---|---|---|---|---|---|---|---|---|
| V1 | B/2 | — | — | 55*) | 18.0 | 240 | 245 | difficult |
| V2 | B/1 | — | — | | 28.0 | 195 | 197 | not possible, tube tears |
| V3 | B/2 | 0.2 A/1V | — | | 9.0 | 270 | 325 | pulsating, bottles cannot be produced |
| V4 | B/2 | 0.5 A/1V | — | 85 | 7.0 | 285 | 345 | slightly pulsating |
| V5 | B/2 | 1.0 A/1V | — | 100 | 5.5 | 295 | 340 | slightly pulsating |
| V6 | B/2 | 0.5 A/2V | — | | | 225 | 235 | not possible, tube tears |
| V7 | B/2 | 1.5 A/4 | — | 170 | 1.7 | 375 | 405 | acceptable, but very pronounced swelling |

*) only processable at 235° C.

The results show that high, blowable viscosities are obtained with various acid-containing crosslinking agents. With the novel crosslinking agents, however, considerably more uniform products are obtained, with constant, nonfluctuating processing.

With additives having a low acid content (Polybond) a sufficiently high viscosity cannot be obtained merely by compounding; solid-phase postcondensation is necessary here.

TABLE 2

| Example | B [% by weight] | A | C | VN [ml/g] | Tensile strength ISO 527 | Impact strength ISO 179 kJ/m² |
|---|---|---|---|---|---|---|
| 10 | B/3 | 0.1 A/1 | 30 | 154 | 150 | 80 |
| 11 | B/3 | 0.2 A/1 | 30 | 159 | 154 | 79 |
| 12 | B/4 | 0.1 A/1 | 30 | 144 | 144 | 77 |
| 13 | B/4 | 0.2 A/1 | 30 | 155 | 149 | 80 |
| V8 | B/3 | — | 30 | 124 | 115 | 34 |
| V9 | B/4 | — | 30 | 115 | 95 | 22 |

We claim:

1. In a method of molding thermoplastic amino-containing thermoplastic polymers into which are blended branching agents, the improvement wherein the branching agent includes a homo- or copolymer A) comprising $A_1$) 40–100% by weight of monomers of the formula I

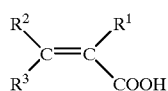

$A_2$) 0–60% by weight of monomers of the formula II

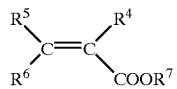

and $A_3$) 0–10% by weight of further monomers capable of free radical polymerization, the percentages by weight of the monomers $A_1$) to $A_3$) summing to 100% and $R^1$ and $R^4$ being identical or different radicals and each being hydrogen or $C_1$–$C_4$-alkyl, $R^2$, $R^3$, $R^5$, $R^6$ being identical or different radicals and each being hydrogen or $C_1$–$C_4$-alkyl, with the proviso that at least two radicals from the group consisting of $R^1$, $R^2$ and $R^3$ and from the group consisting of $R^4$, $R^5$ and $R^6$ are hydrogen, and $R^7$ is alkyl, cycloalkyl, aryl or aralkyl.

2. The method of claim 1, wherein the amino-containing thermoplastic polymers are selected from the group consisting of the polyamides, polyurethanes, polyetheramides, polyesteramides, polyimides and polyamidoimides.

3. The method of claim 1, wherein the homo- or copolymers A) are composed of

80–100% by weight of $A_1$) and

0–20% by weight of $A_2$).

4. The method of claim 1, wherein the homo- or polymer A) has an average molecular weight of from 4000 to 200,000 g/mol.

5. A thermoplastic molding material containing

A) 0.01–1% by weight of a homo- or copolymer composed of

A₁) 40–100% by weight of monomers of the formula I

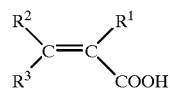

A₂) 0–60% by weight of monomers of the formula II

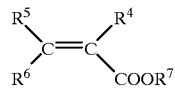

and
A₃) 0–10% by weight of further monomers capable of free radical polymerization,
the percentages by weight of the monomers A₁) to A₃) summing to 100% and
$R^1$ and $R^4$ being identical or different radicals and each being hydrogen or $C_1$–$C_4$-alkyl,
$R^2$, $R^3$, $R^5$, $R^6$ being identical or different radicals and each being hydrogen or $C_1$–$C_4$-alkyl,
with the proviso that at least two radicals from the group consisting of $R^1$, $R^2$ and $R^3$ and from the group consisting of $R^4$, $R^5$ and $R^6$ are hydrogen, and
$R^7$ is alkyl, cycloalkyl, aryl or aralkyl, B) 20–99.99% by weight of a thermoplastic polyamide and C) 0–70% by weight of further additives and processing assistants, the sum of the percentages by weight of the components A) to C) being 100%.

6. A thermoplastic molding material as claimed in claim 5, in which the thermoplastic polyamide is composed of PA6, PA66, PA 6T/6, PA 6T/66 or a mixture thereof.

7. A thermoplastic molding material as claimed in claim 5, in which the polyamide B) has a viscosity number VN of from 130 to 300 ml/g.

8. A process for the preparation of thermoplastic molding materials as claimed in claim 5, wherein the component A) is added to the melt of the component B) and, if required, C).

9. A process as claimed in claim 8, wherein the component A) is added in the form of an aqueous solution or dispersion to the melt of the component B).

10. A process for the preparation of thermoplastic molding materials as claimed in claim 5, wherein the component A) is applied to granules of the component B) and, if required, C) and compounding.

11. A coextrudate, blow molded article, profile extrudate, pipe extrudate or three-dimensional extrudate having little pinch-off, obtained from a thermoplastic molding material as claimed in claim 5.

* * * * *